(12) United States Patent
Pitlor

(10) Patent No.: US 7,819,374 B2
(45) Date of Patent: *Oct. 26, 2010

(54) TAMPER RESISTANT DEVICE ATTACHMENT

(75) Inventor: Nelson D. Pitlor, Twinsburg, OH (US)

(73) Assignee: Accessmount LLC, Twinsburg, OH (US)

( * ) Notice: Subject to any disclaimer, the term of this patent is extended or adjusted under 35 U.S.C. 154(b) by 1258 days.

This patent is subject to a terminal disclaimer.

(21) Appl. No.: 11/167,039

(22) Filed: Jun. 24, 2005

(65) Prior Publication Data

US 2005/0253032 A1    Nov. 17, 2005

Related U.S. Application Data

(63) Continuation-in-part of application No. 10/007,509, filed on Dec. 5, 2001, now Pat. No. 7,287,738, which is a continuation-in-part of application No. 09/730,920, filed on Dec. 6, 2000, now Pat. No. 6,644,617.

(51) Int. Cl.
*F16M 13/00* (2006.01)

(52) U.S. Cl. ...................................... 248/544

(58) Field of Classification Search ........................ None
See application file for complete search history.

(56) References Cited

U.S. PATENT DOCUMENTS

| | | | |
|---|---|---|---|
| 940,899 A | 11/1909 | Sherrer |
| 1,320,902 A | 11/1919 | Newton |
| 1,357,539 A | 11/1920 | Bissell |
| 3,838,269 A | 9/1974 | Bogdanovs |
| 4,160,286 A | 7/1979 | Merritt |
| 4,344,114 A | 8/1982 | Denhart |
| 4,453,202 A | 6/1984 | Morris et al. |
| 4,460,945 A | 7/1984 | Chan et al. |
| 4,460,947 A | 7/1984 | Kelly |
| 4,531,179 A | 7/1985 | Baker |
| 4,893,226 A | 1/1990 | Neece |
| 5,357,413 A | 10/1994 | Mandall |
| 5,690,425 A | 11/1997 | Knoll, Jr. |
| 5,845,988 A | 12/1998 | Mandall |
| 5,865,532 A | 2/1999 | Bonazzi |
| 6,179,435 B1 | 1/2001 | Wilson |
| 6,227,680 B1 | 5/2001 | Arndt |
| 6,416,205 B2 | 7/2002 | Uedono |
| 6,502,975 B1 | 1/2003 | Branstetter |
| 6,511,213 B1 | 1/2003 | Maley, Sr. |

(Continued)

*Primary Examiner*—Gwendolyn Baxter
(74) *Attorney, Agent, or Firm*—D. A. Stauffer, Reg. Patent Agent

(57) ABSTRACT

A method and apparatus for tamper resistant device attachment to a mounting surface is disclosed. A remotely attachable and separable coupling system has: a base member that is attachable to the surface; a covered mount with a cover as a front side suitable for attaching the device thereto; a coupling that removably couples the back side of the mount to the base member such that the base member, the coupling, and a back side of the mount are enclosed between the cover and the mounting surface; and an attachment of the device to the front side of the mount is such that the attachment is only accessible for operation from the back side of the mount. The attachment is inherently tamper resistant in that a tool is required to uncouple it. Attaching the system components as taught makes all parts of the system including attached devices tamper resistant, and applying lock and key technology enhances this.

12 Claims, 6 Drawing Sheets

U.S. PATENT DOCUMENTS

| | | |
|---|---|---|
| 6,644,617 B2 | 11/2003 | Pitlor |
| 7,287,738 B2 * | 10/2007 | Pitlor ......................... 248/544 |
| 2002/0079412 A1 | 6/2002 | Pitlor |
| 2003/0035300 A1 | 2/2003 | Branstetter |
| 2004/0065798 A1 | 4/2004 | Pitlor |

* cited by examiner

TAMPER RESISTANT DEVICE ATTACHMENT

CROSS-REFERENCE TO RELATED APPLICATIONS

This application is a continuation-in-part of commonly-owned, U.S. patent application Ser. No. 10/007,509, filed Dec. 5, 2001, now U.S. Pat. No. 7,287,738, which is a continuation-in-part of commonly-owned, U.S. patent application Ser. No. 09/730,920, filed Dec. 6, 2000 and issued Nov. 11, 2003 as U.S. Pat. No. 6,644,617, all of which hereby are incorporated herein by reference.

TECHNICAL FIELD OF THE INVENTION

The present invention generally relates to surface mounting of devices, more particularly to tamper resistant removable attachment of the devices, and is particularly exemplified by illumination with guard means.

BACKGROUND OF THE INVENTION

A long standing problem related to sources of illumination in public places is prevention of, or at least resistance to, tampering or vandalizing, particularly when the source is publicly accessible. Examples include light fixtures in elevators, hallways, train or bus passenger compartments, etc. The long standing nature of this problem is evidenced by U.S. Pat. No. 940,899 issued to W. G. Sherrer in 1909 for a safety globe and guard for a gas lamp, intended to thwart "mischievous persons [from] . . . reaching the light." The guard for restricting access to the gas burner is a wire frame globe with a tamper resistant lock box (15).

The tamper proofing problem applies to many types of fixtures or devices that may be used in public places, for example: smoke detectors, thermostats, exit signs, alarms, speakers, etc. Because of their long history, light sources are used as a representative device in the present consideration of prior art.

In most situations requiring tamper resistance, the light source is a fixture, or at least a socket, that is mounted on, or recessed within a wall or ceiling surface. A known method for providing tamper resistance includes mounting a light source/fixture on or within the mounting surface, covering it with a breakage resistant transparent or translucent shield (e.g., Lexan®), and only allowing access to the light source and/or fixture from behind the mounting surface. For example, this method is used in prison cells as disclosed in U.S. Pat. No. 4,453,202 (Morris et al.; 1984) wherein a vandal-resistant light fixture (11) has a transparent cover (19) attached to a mounting surface (wall 16) by threaded studs (13) extending rearward from the cover through the wall to be attached with nuts (15) on the other (rear) side of the wall, i.e., in an area outside of the chamber being lighted. A light source (12) is removably attached inside the cover by means of an access hole (83) through the wall.

It is apparent that the forgoing example of tamper resistance results from an inability to detach the cover or the covered fixture from the lighted side of the mounting surface (wall) unless accessed from the rear of the surface. Also, the light source is inaccessible from the lighted side of the surface but can be removed from the rear (through the access hole) without removing the cover. In most situations, this method of tamper resistance is inconvenient at best, and usually is not even possible. Other examples of fixtures that are accessible from the front or outside of the mounting surface can be seen in U.S. Pat. No. 1,357,539 (Bissell; 1920) and U.S. Pat. No. 4,344,114 (Denhart; 1982) wherein a shielding means comprising bars (6 in Bissell) or a housing (H in Denhart) with see-through tamper-proof panels (52, 54, 56); is held closed by a padlock (e.g., 64 in Denhart).

Although relatively secure, use of a padlock is both unsightly and expensive; and secure rear access to a fixture is often unpractical. It is an object of the present invention to overcome these and other limitations of the prior art to provide an inexpensive and practical tamper resistant fixture enclosure. It is a further object to extend the principles of the present invention to apply to fixtures or devices that may be rugged enough that they do not require an added enclosure, but which require tamper resistant attachment to a mounting surface.

BRIEF SUMMARY OF THE INVENTION

According to the invention a tamper resistant system for attaching a device to a mounting surface is disclosed, the system comprising: a base member that is attachable to the surface; a covered mount comprising a cover as a front side suitable for attaching the device thereto, and a back side; a coupling that removably couples the back side of the mount to the base member; such that when the mount is coupled to the base member; the base member, the coupling, and the back side of the mount are enclosed between the cover and the mounting surface; and an attachment of the device to the front side of the mount such that the attachment is only accessible for operation from the back side of the mount.

According to the invention, the coupling of the tamper resistant system further comprises: a first electrical terminal on the base member and a second electrical terminal on the mount such that the first and second electrical terminals are electrically connected when the mount is coupled to the base member, and such that the first and second electrical terminals are electrically disconnected when the mount is uncoupled from the base member.

According to the invention, the tamper resistant system further comprises: a mechanical retainer portion of the coupling comprising a retention member mounted to the base member or the mount, and a movable grabber member mounted to the opposing member and arranged for coupling to the retention member; an installation and removal tool for operating the grabber member; and an access hole in the cover for enabling access of the tool to the coupling. Preferably the tamper resistant system further comprises a magnetic device to hold the mount and base together, and/or a keyed shape of the tool; and a keyhole and lock mechanism configuration applied to the access hole and/or the movable grabber mechanism.

According to the invention, the attachment of the device to the front side of the mount of the tamper resistant system further comprises: a nut and bolt arrangement wherein a first component of the nut and bolt is fixed as a part of the device, and the corresponding second component of the nut and bolt is removably attached to the first component only when accessed from the back side of the mount. Alternatively, the attachment of the device to the front side of the mount further comprises a clip or a tab. Alternatively, the attachment of the device to the front side of the mount further comprises: a foot portion of the device; a separable flange portion of the device that is configured to overlap the foot portion; and the attachment of the device to the front side of the mount being an attachment of the flange portion of the device to the front side of the mount such that the attachment is only accessible for operation from the back side of the mount.

According to the invention, a tamper resistant enclosure for a device that is attached to a mounting surface is disclosed, the enclosure comprising: a base member that is attachable to the surface; a covered mount comprising a cover as a front side suitable for mounting the device thereto, and a back side; a tamper resistant coupling that removably couples the back side of the mount to the base member; such that when the mount is coupled to the base member; the base member, the coupling, and the back side of the mount are enclosed between the cover and the mounting surface; and an attachment of the enclosure to the front side of the mount such that the attachment is only accessible for operation from the back side of the mount, and wherein the enclosure resists tampering with the device and the mounting of the device to the mount.

According to the invention, the enclosure of the tamper resistant enclosure comprises a light transmitting material; and the device comprises a light source.

According to the invention, the coupling of the tamper resistant enclosure further comprises a first electrical terminal on the base member and a second electrical terminal on the mount such that the first and second electrical terminals are electrically connected when the mount is coupled to the base member, and such that the first and second electrical terminals are electrically disconnected when the mount is uncoupled from the base member.

According to the invention, the tamper resistant enclosure further comprises: a mechanical retainer portion of the coupling comprising a retention member mounted to the base member or the mount, and a movable grabber member mounted to the opposing member and arranged for coupling to the retention member; an installation and removal tool for operating the grabber member; and an access hole in the cover for enabling access of the tool to the coupling.

According to the invention, a method for tamper-resistantly attaching a device to a mounting surface is disclosed, the method comprising the steps of: attaching a base member to the surface; removably coupling a mount to the base member; covering the mount such that when the mount is coupled to the base member; the base member, the coupling, and a back side of the mount are enclosed between the cover and the mounting surface; and attaching the device to a front side of the mount cover such that the attachment is only accessible for operation when the mount is uncoupled from the base member.

According to the invention, the method further comprises the step of supplying electrical power to the device such that the power is electrically connected when the mount is coupled to the base member, and such that the power is electrically disconnected when the mount is uncoupled from the base member.

According to the invention, the method further comprises the steps of: using an installation and removal tool for coupling and uncoupling the coupling; and enabling access of the tool through the cover in to the coupling. Preferably the method further comprises the steps of: configuring the tool as a key; and applying a keyhole and lock mechanism configuration to the access of the tool and/or to the coupling.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Figure 1:
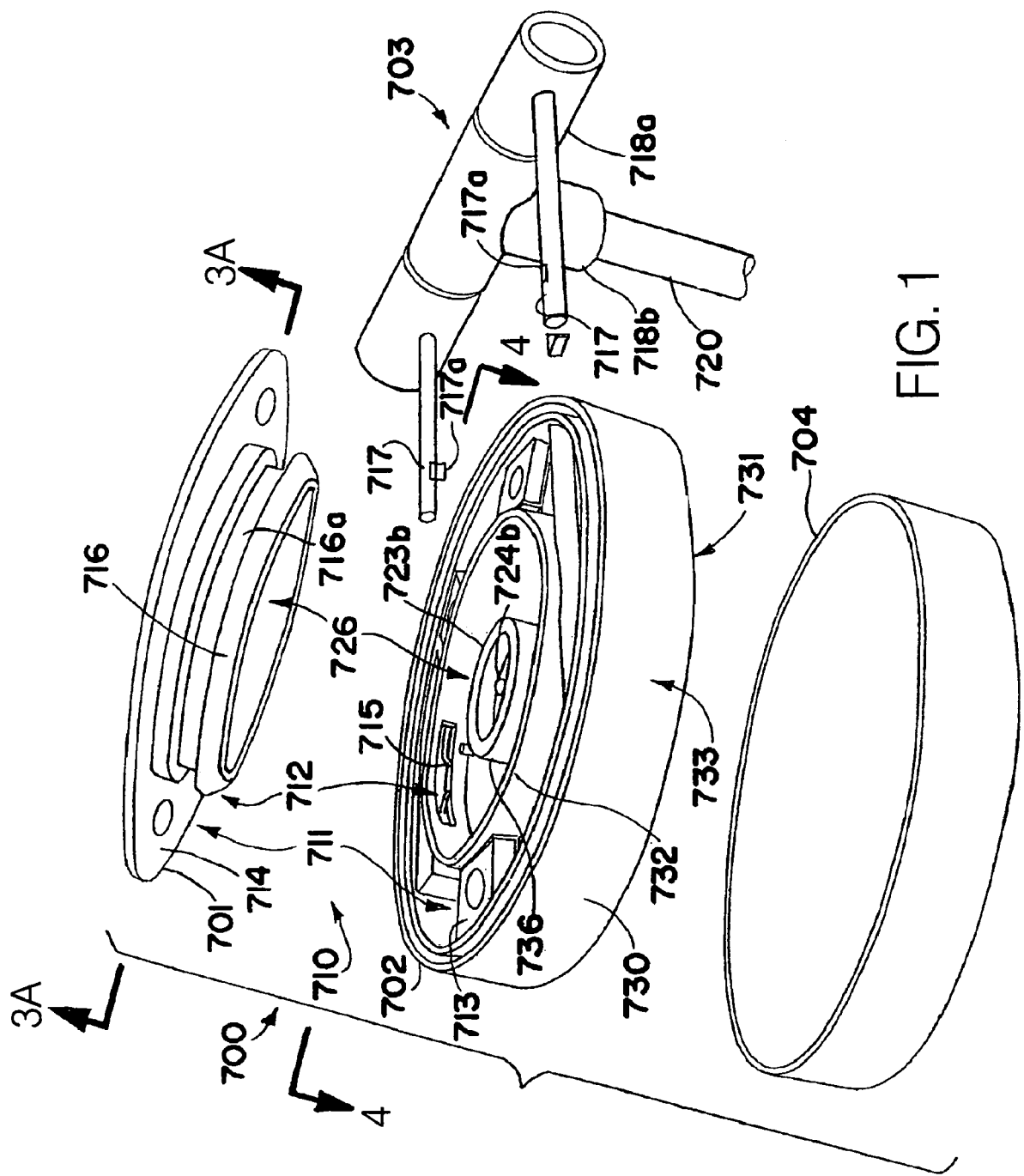
Figure 2:
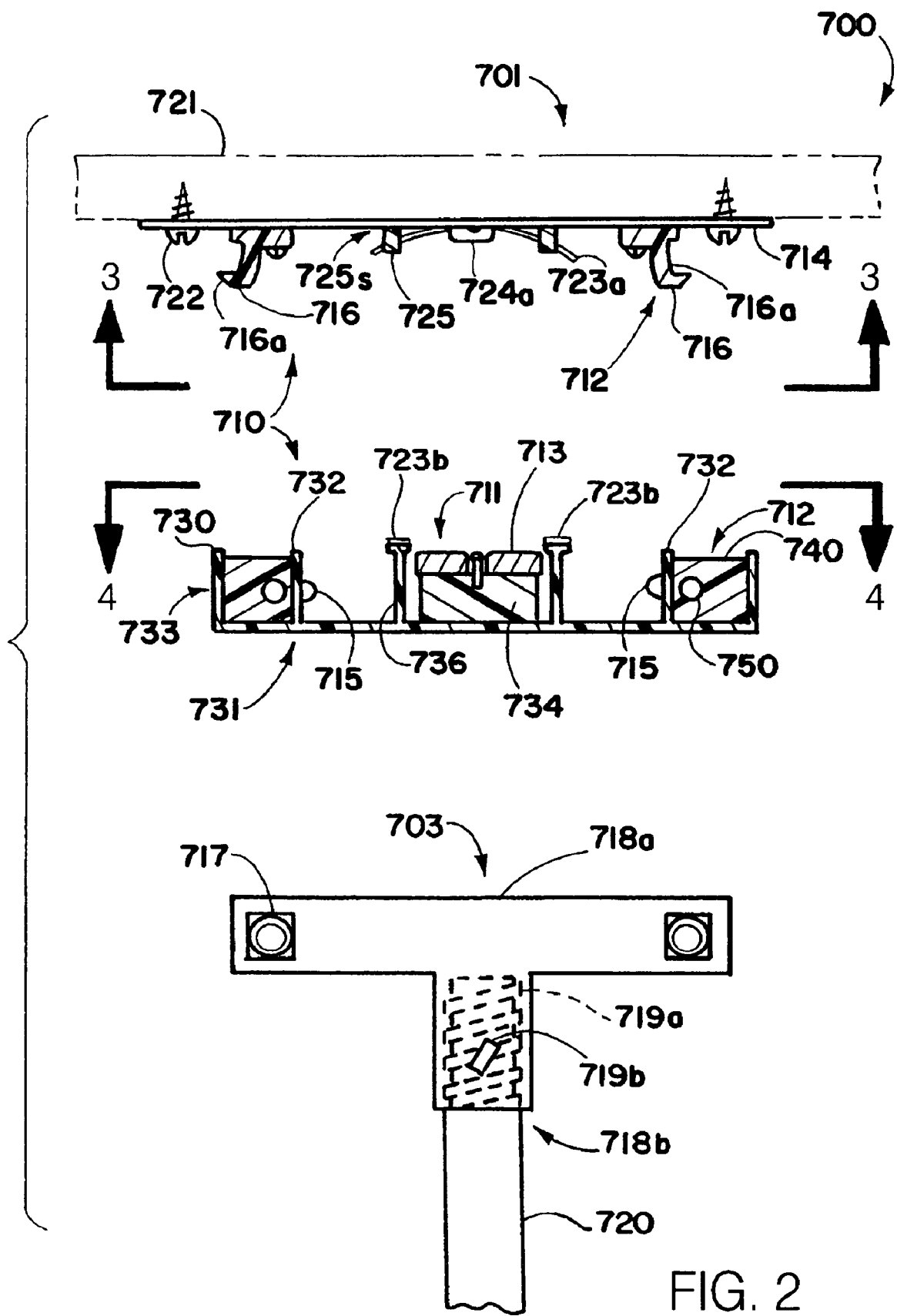
Figure 3A:
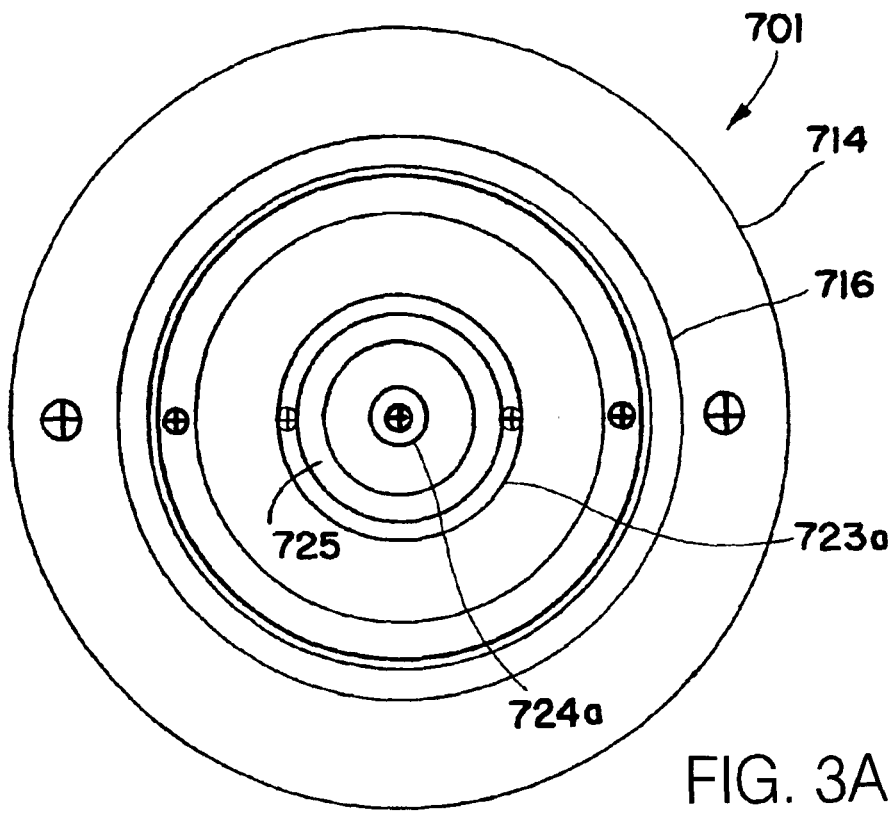
Figure 3B:
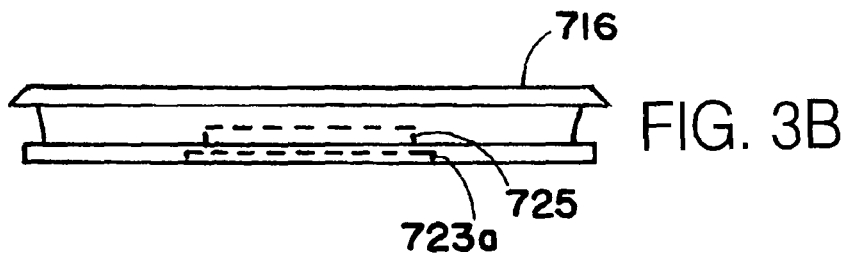
Figure 3C:
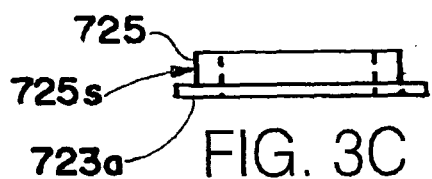
Figure 3D:
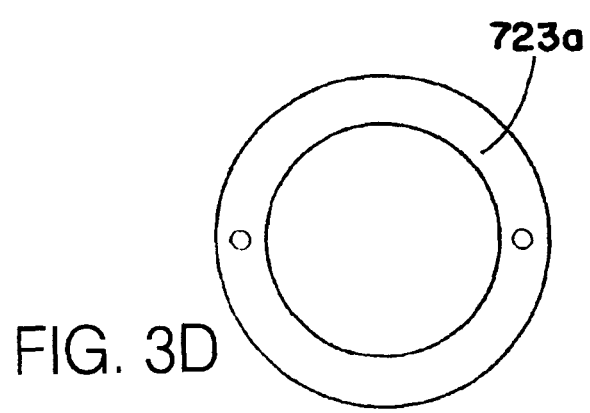
Figure 3E:
Figure 4:
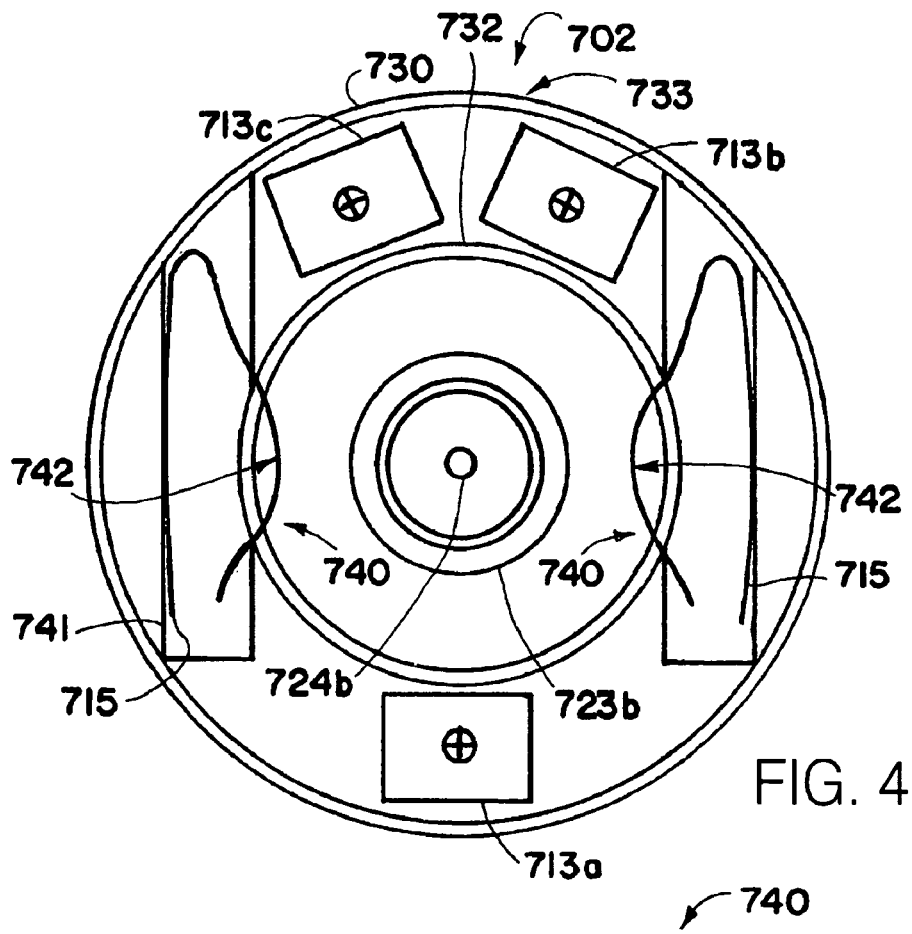
Figures 5A, 5B:
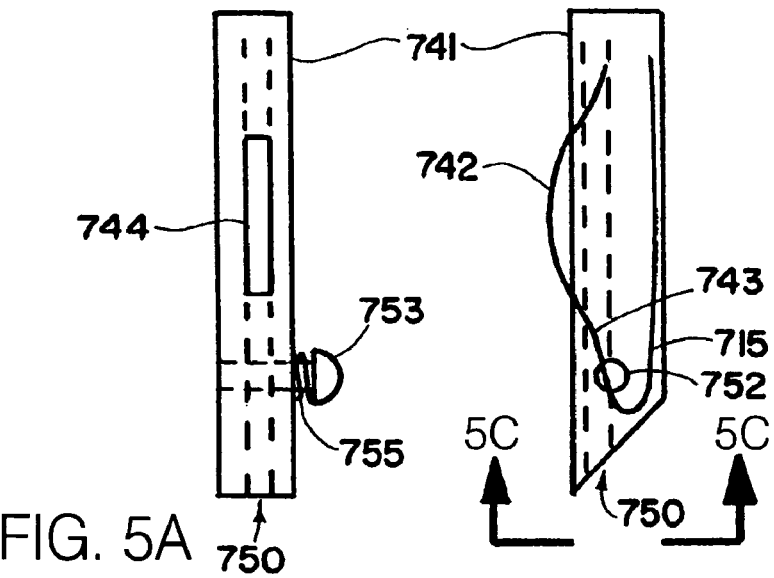
Figures 5C, 5D:
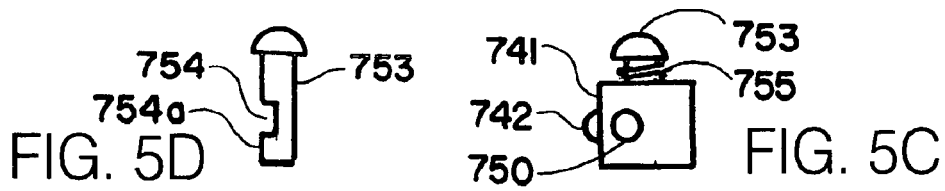
Figure 6:
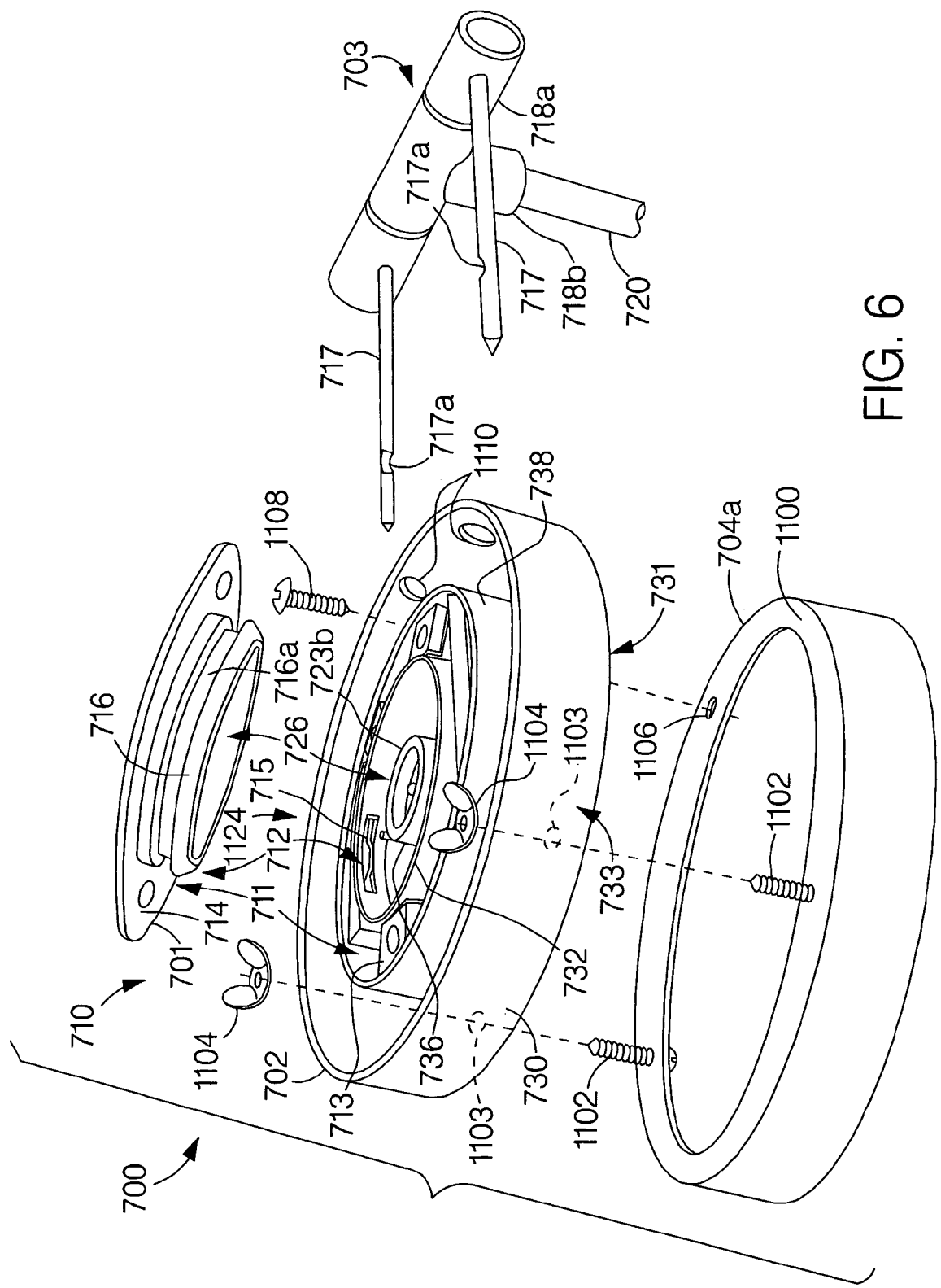
Figure 7:
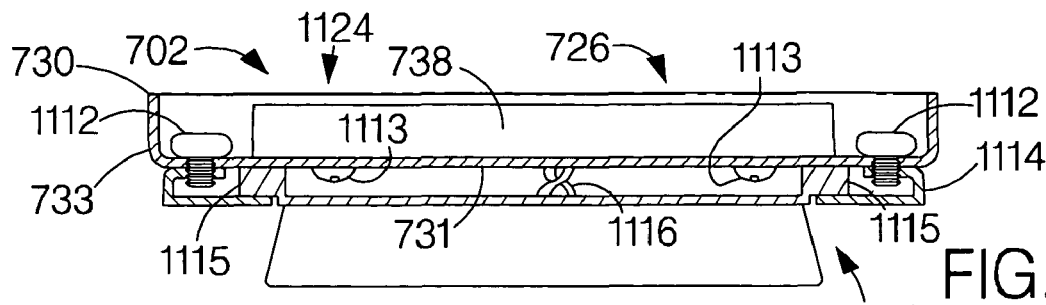
Figure 8:
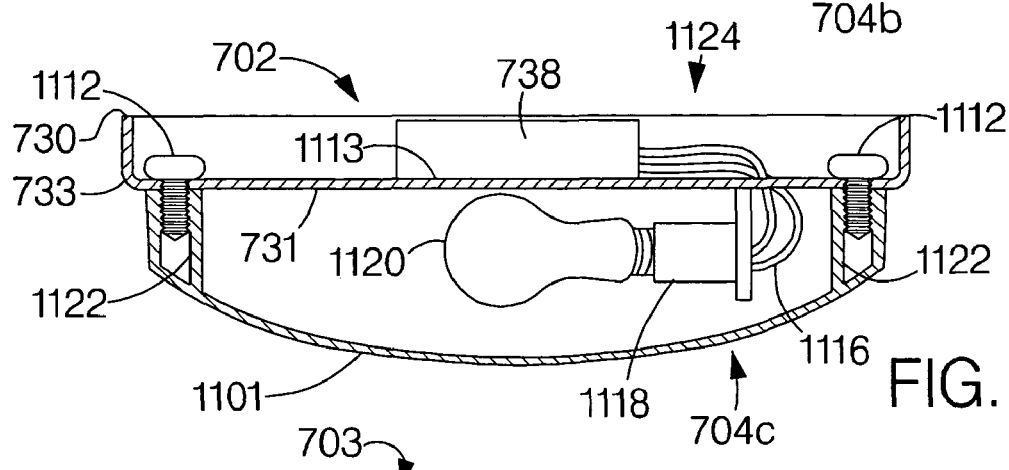
Figure 9A:
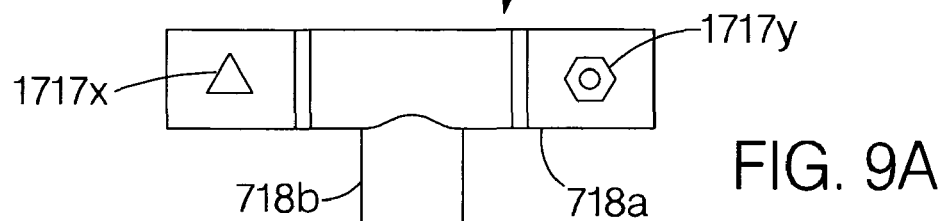
Figure 9B:
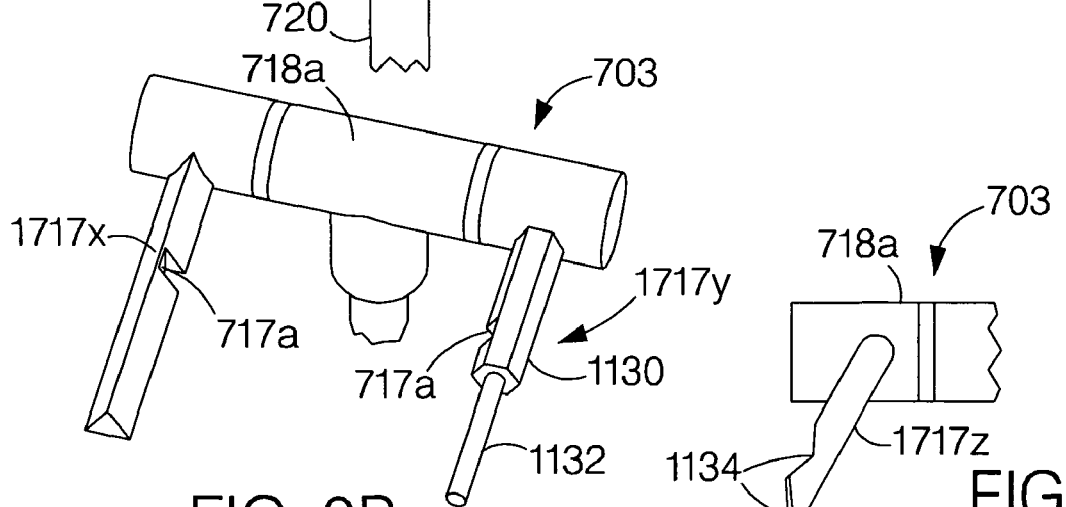
Figure 10:
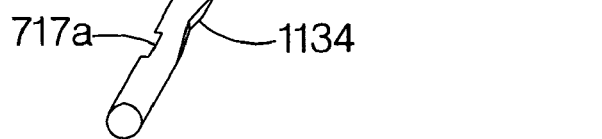

The structure, operation, and advantages of the present preferred embodiment of the invention will become further apparent upon consideration of the following description taken in conjunction with the accompanying drawings, wherein:

FIG. 1 is an exploded isometric view of a remotely attachable and separable coupling system of the invention employing a dual retention mechanism;

FIG. 2 is an exploded section view of the system of FIG. 1;

FIG. 3A is a bottom view of a base member of the system of FIG. 1;

FIG. 3B is a side elevation view of a retention member for the system of FIG. 1;

FIG. 3C is a schematic side elevation view of a mounting ring and a circular ring contact for the system of FIG. 1;

FIGS. 3D and 3E are, respectively, top plan and side elevation views of the circular ring contact for the system of FIG. 1;

FIG. 4 is a top view, partly broken away to show respective clips of a mount of the system of FIG. 1;

FIG. 5A is a fragmentary elevation view of the clip holder and clip slot of the mount of the system of FIG. 1;

FIG. 5B is a fragmentary elevation section view of the clip holder, clip slot and clip of the mount of the system of FIG. 1;

FIG. 5C is a fragmentary front view of the clip holder with a locking pin looking generally in the direction of the arrows 5C-5C of FIG. 5B;

FIG. 5D is an elevation view of a locking pin;

FIG. 6 is an exploded isometric view of the coupling system of FIG. 1, showing a first example of attachment of a device to the mount;

FIG. 7 is a partial cross-sectional side view of the mount of the system of FIG. 1, showing a second example of attachment of a device to the mount;

FIG. 8 is a partial cross-sectional side view of the mount of the system of FIG. 1, showing a third example of attachment of a device to the mount;

FIGS. 9A and 9B are, respectively, side elevation and top perspective views of a tool of the system of FIG. 1, showing embodiments of decoupling arms; and FIG. 10 is a top perspective view of a portion of a tool of the system of FIG. 1, showing another embodiment of a decoupling arm.

DETAILED DESCRIPTION OF THE INVENTION

An inexpensive and practical tamper resistant device attachment to a mounting surface (structure) is described hereinbelow in combination with an inventive remotely attachable and separable coupling system as described in the co-pending commonly owned applications (previous applications) of which the present application is a continuation in part. Although a particular embodiment of the coupling system is described in the foregoing disclosure, it should be apparent that the present invention is not dependent upon, or limited to, any one embodiment of the inventive coupling system. For example, the coupling system and attached devices are illustrated with a generally circular shape, but at least the outer cover of the coupling system and/or the attached device could be square, rectangular, or any other shape. Furthermore, the invention may be applicable to any coupling system wherein a base member is fixedly attached to a structure (e.g., a wall or ceiling surface); a device (the term including fixtures, protective enclosures, alarms, etc.) is attached to a mount such that the attachment is only accessible for attaching and detaching from a back side of the mount; and the mount is removably coupled with a tamper resistant coupling to the base member such that, when coupled, the back side of the mount is inaccessible except by a coupling and decoupling (installation and removal) tool. Referring to FIG. 1, the abovementioned "base member" is disclosed in the previous applications as a base 701 or base member 701; the "mount" is disclosed in the previous applications as a mount 702, preferably including a cover 730; and the "device, fixture, protective enclosure, alarm, etc." is disclosed generically in the previous applications as a device 704.

An embodiment of a remotely attachable and separable coupling system 700 according to the invention is illustrated in FIGS. 1-5. In this embodiment the retention mechanism that retains the mount 702 and base member 701 together would be hidden from normal view when the system is assembled. Thus, the complete system 700 has an aesthetically pleasing structure, while maintaining the basic functionality of the embodiment.

Referring briefly to FIGS. 1-5D, a remotely attachable and separable coupling system 700 includes both the mentioned "hidden" feature and a dual retention mechanism. The system 700 includes a base member 701, a mount 702, and an installation and removal tool 703. The base member 701 is intended to be secured to a fixed structure or to some other device, and the mount 702 mates to the base member 701. Removal and installation of the mount 702 is accomplished through the use of the installation and removal tool 703. The installation and removal tool 703 may be used for remote installations of the system 700, allowing the user to remain safely on ground level while installing or removing the mount 702 relative to the remotely located or otherwise difficult to reach base member 701. A device 704 may be coupled to the mount 702; exemplary devices may be a smoke detector or other detector, a light fixture (or part thereof), a sign, a signaling device, a viewing device such as a camera, a display, etc. Various techniques, e.g. screws, clips, adhesive, etc., may be used to couple the device 704 to the mount 702. The device 704 may be a part of and/or be integral with the mount 702. The components of this embodiment of the system 700 will now be described in more detail.

The dual retention mechanism 710 for holding together or coupling the base member 701 and mount 702 includes a magnetic coupling system or device 711 and a selectively operable mechanical retainer 712. If desired, the retention mechanism 710 may include more than two coupling or retainer systems to hold the base member and mount together. Also, it will be appreciated that features of the retention mechanism 710 may be used alone, with other parts that are illustrated and described herein and/or with still other systems, devices or the like.

The magnetic coupling system 711 includes at least one (or more) magnets 713 and another part 714 to which the magnet may hold with a magnetic retention force. Such other part 714 may be a ferrous plate, as was described above, another metal or other material to which a magnet may tend to hold, or even another magnet. In the embodiment illustrated in FIGS. 1-5D three magnets 713a, b, c are shown distributed about the mount 702. Each magnet may couple magnetically to the ferrous plate 714 or the like.

The selectively operable mechanical retainer 712 provides a secure mechanical coupling between the base member 701 and mount 702 when coupled together. Such mechanical coupling ordinarily would retain the base member 701 and mount 702 coupled together in case the magnetic coupling system 711 were to release unexpectedly or otherwise. The selectively operable mechanical retainer 712 includes a movable grabber member 715 and a retention member 716. The grabber member 715 may be operated by the installation and removal tool 703.

The installation and removal tool 703 is used to couple and/or to decouple the mount 702 with respect to the base member 701. The tool includes decoupling arms 717 that cause the grabber member 715 to retract from a retaining or locking relation with the retention member 716 as the decoupling arms are inserted into the mount 702. The tool 703 has a base 718a with a socket 718b that accepts an elongated member, such as a pole 720. The socket and pole may be threaded at 719a to secure the base and pole together in a threaded connection coupling, and a set screw 719b may be used to lock the pole to the base, e.g. preventing unscrewing from the threaded connection. The pole may increase the reach of the tool to permit access to normally out of reach locations for coupling and/or decoupling the mount 702 with respect to the base member 701 of the system 700.

In FIGS. 1-5D particularly several views of the base member 701 are shown. The base member 701 forms the inner half of the system 700 of the invention and is secured to a structure 721 (FIG. 2), such as a wall, a ceiling or a pole. In many uses of the invention the structure 721 may be relatively fixed, e.g. a wall, or movable, e.g. a pole. The base member 701 includes several subcomponents, one of which is the base plate 714. The base plate 714 is the primary instrument for attaching the base member 701 to a fixed object and provides strength and rigidity to the base member 701. Fasteners, such as screws 722, are used to secure the base plate to the structure 721. Depending on the mounting structure, other components may be required. For example, if the base member 701 were to be secured to a pole, a U-shape bracket may be employed. The base plate 714 is made from a rigid material, such as steel, but it may be made out of any suitable material that provides the strength and rigidity to support the mount 702 and any device 704 attached to the mount. In an embodiment, the base plate 714 is of a ferrous or other material to which magnets 713 may be held by magnetic force. If the base plate 714 were of non-magnetic material, magnetic materials may be attached to the base plate 714 to provide a coupling mechanism for the magnets 713 of the magnetic coupling system 711. An example of an alternative coupling system to couple the base member and mount may use one or more Velcro® fasteners. The magnetic coupling system 711 will be described in more detail below. The base plate 714 also is used to attach the remaining subcomponents of the base member 701. These subcomponents include the retention member 716, an electrically conductive ring 723a, a fixed electric terminal 724a, and an electrical insulation ring 725.

It will be appreciated that the system 700 of the invention has a dual retention mechanism 710 that includes two different coupling systems to secure the mount 702 to the base member 701. The first, the magnetic coupling system or device 711, was briefly described above. The second coupling system is the mechanical coupling system 712, also referred to above as the selectively operable mechanical retainer, which is distributed between the base member 701 and the mount 702. The base member 701 coupling component includes the retention member 716. The retention member 716 is attached to the base plate 714 and may be secured by fasteners, such as a nut and bolt or a screw, or it may be bonded to the base plate 714. The retention member 716 can be constructed in several different forms. For example, the retention member 716 may be rectangular in shape, or it may be a set of rails mounted on each side of the base plate 714, or it may be a circular ring. A circular ring has an advantage over other designs in that no matter what the orientation of the mount 702 is relative to the base member 701, the retention member 716 will always be aligned with its respective member in the mount 702. A rectangular design or rails may only mate correctly in two, four or other specified orientations. The retention member 716 has a groove, recess, chase, or other geometry 716a along its outer edge to accept the grabber member 715, such as a clip or similar device, from the mount 702, such that after the mount 702 and the base member 701 are mated together, the clip fits inside the groove or other geometry of the retention member 716 and prevents the two units from separating. Separation requires that the clip 715 be mechanically moved from a position in which it cooperates with the retention member 716 to hold the base member and mount together to a position releasing the mount from the base member. The retention member 716 may be made of plastic or any other suitable material.

Electrical connections 726 may be provided between the base member 701 and mount 702. For example electrical connections on the base member 701 may provide electrical power from the base member 701 to the mount 702. This electrical power may be used to power a device, e.g. device 704, which is attached to or is part of the mount 702. For example, a light fixture type device 704 may be the recipient of the power, in which case the power will be 100, 115, 220, 240 VAC or some other suitable line voltage or other voltage. The electrical connections also may be used as a signal connection, in which case it will transmit data to and from a device attached to the mount 702 relative to some remote location. For example, the device 704 attached to the mount 702 may be a smoke detector and the signal connection may be to a remote computer, the computer having the responsibility of monitoring the status of one or more devices within a building. If the smoke detector detects a problem (e.g. low battery charge, high temperature, or smoke), the smoke detector will transmit the data over the signal connection to the central computer and the computer may act accordingly. The electrical connections also may be used to monitor the status of the system 700 and/or the device 704. For example, instead of sending a digital transmission to a central computer, the signal may be a simple contact closure to an alarm panel, or some other indication device. The electrical connections or electrical coupling apparatus between the base member 701 and the mount 702 can take on various forms, several examples being multiple fixed terminals or fixed conductive rails, each spanning a section of the base member 701 and mount 702 respectively. Such electrical coupling apparatus may require that the mount 702 and the base member 701 be aligned in a specific orientation relative to each other in order to make the proper connections.

Another approach for the electrical connections 726 uses electrically conductive circular rings 723a/723b and centrally located fixed electrical terminals 724a/724b, respectively, associated with the base member 701 and mount 702. The conductive circular rings 723 (refers to both 723a, 723b) and fixed terminals 724 (refers to both 724a, 724b) provide a quick and safe mechanism for connecting and disconnecting the electrical signals and/or power between the base member 701 and the mount 702. Furthermore, such electrical connection arrangement is not dependent on the orientation of the base member 701 relative to the mount 702. The conductive rings 723 may be rigid or flexible (or one may be rigid and the other flexible). Using at least one flexible conductive ring 723 improves the contact to the opposing electrical connection part, e.g. another electrically conductive ring, in the opposing base member 701 or mount 702 as the two are mated together. A ring 725 separates the conductive ring 723 from the fixed terminal 724. The ring 725 may be of electrically insulating material or other material. It may be electrically conductive if electromagnetic shielding or impedance matching characteristics are desired. The ring itself also could be replaced by an air gap that provides suitable electrical insulation characteristics. The ring 725 may include a support portion 725s that supports the electrically conductive ring 723a. While only two electrical connections 726 between the base member 701 and mount 702 are shown in the drawings, the invention is not limited to two connections and there may be fewer or more than two electrical connections between the base member 701 and the mount 702. For example, multiple electrical connections may have multiple conductive rings 723, each conductive ring having a slightly larger diameter than the previous (radially inward) conductive ring, each conductive ring representing a separate electrical connection to the opposite base member or mount, and each conductive ring being separated from adjacent electrically conductive rings by an insulation ring 725.

In FIGS. 3A-E the base member 701, retention member 716, circular electrically conductive ring 723a, fixed terminal 724a, ring 725 and support portion 725s of the ring 725 are shown. Wires, bus connections, etc., may provide electrical connections from some location to the conductive ring 723a, fixed terminal 724a and/or other electrical members of the base member 701.

Referring to FIGS. 1 and 4-5D the mount 702 is shown. The mount 702 mates to the base member 701 and forms the outer shell of the system 700 of the invention. As is the case with the base member 701, the mount 702 also includes several subcomponents. One subcomponent is a cover 730. The cover may be made of a rigid plastic or similar material. The cover could be metal and, if necessary, have suitable electrical insulation to avoid short circuits in electrical connections 726. The face 731 of the cover is flat to provide a mounting platform for a device 704, such as a light fixture or a smoke detector. The face 731 may be some other appropriate shape to facilitate attaching to a device 704 or for another purpose. Such devices may be electrically powered or battery powered, depending on their intended purpose. If necessary, electrical connections may be provided from the electrically conductive ring 723a, fixed terminal 724a and/or any other terminals in the mount 701 to corresponding terminals of the device 704. Also, as was mentioned above, the device 704 may be integral with or substantially integral with the mount 702.

The cover 730 has internal guide rings 732, which may be circular or other appropriate shape, to facilitate mating the mount 702 to the base member 701. The guide rings 732 may be angled slightly to ease installation of the mount 702. The outer wall 733 of the mount 702 helps to minimize dirt and dust entry in the area between the mount 702 and the base member 701. The outer wall 733 also increases the strength of the overall structure and improves the appearance of the system 700. Magnet mounts or standoffs 734 provide an elevated mounting surface for the magnets 713, such that the magnets are approximately flush with the top surface of the outer wall 733 and can mate with and secure to the plate 714. The standoffs 734 may be of plastic to avoid interfering with the operation of the magnets 713, or may be of some other material. The magnets 713 and associated components will be discussed in more detail below. Similarly, the conductive ring standoff 736 provides an elevated mounting surface for a conductive ring 723b such that the conductive ring 723b also is approximately flush with the top surface of the outer wall 733.

The electrical connections 726 within the mount 702 are similar to the electrical connections within the base member 701. These electrical connections may be for power, such as 115 VAC for a light fixture, for a signal connection to digitally communicate to a remote device, for a simple status indication, such as a contact closure indicating whether the device mounted on the cover is operational, etc. The coupling apparatus for the electrical connections are similar to those of the base member 701. This type of electrical connection provides a quick and safe way to connect and disconnect the electrical signals without the requirement of physically removing a connection (e.g. disconnecting a wire from a terminal).

The first of the two coupling systems that holds the mount 702 to the base member 701 is the magnetic coupling system 711. The magnets 713 thereof provide force to hold the mount 702 to the base member 701 during installation and removal of the mount 702. There are three magnets mounted in the cover 730, as is shown in FIGS. 1, 2, and 4, to provide holding force sufficient to keep the mount 702 and any attached or integral device 704 secured to the base member 701. More or fewer magnets may be used to achieve application specific results (e.g. to increase the holding force by increasing the number of magnets, to distribute the places where magnetic force is used, to allow use of fewer or more magnets of larger or smaller magnetic strength, etc.). The magnets 713 may be bonded by adhesive or other means to the magnet stand offs 734 or they may be secured thereto using a fastener, such as a screw. A purpose of the magnetic coupling system 711 is to hold the mount 702 to the base member 701 during installation and removal of the mount. During this period the mechanical coupling system 712 is not active, since during installation and removal of the mount 702 the mechanical coupling system 712 would be selectively disengaged. The mechanical coupling system 712 is discussed in more detail below. The magnets 713 also will hold the mount 702 to the base member 701 in the event that the mechanical coupling system were unintentionally released. In an alternate embodiment of the present invention, the magnetic coupling system 711 may be replaced by another retention mechanism, such as Velcro® fasteners or a similar device. Such retention mechanisms can operate by placing parts together usually without the need to move parts, e.g. as the movement in the mechanical coupling system 712.

In addition to the magnetic coupling system 711, the invention also includes the mechanical coupling system 712. The magnetic coupling system 711 and the mechanical coupling system 712 operate in tandem and ensure that if one coupling system fails, the other coupling system will maintain the mount 702 attached to the base member 701. The mechanical coupling system 712 may take on several forms, such as a retractable clip systems shown in FIGS. 1-5D, or a touch latch, or a slam latch.

A retractable clip system 740 type of mechanical coupling system 712 may be used to secure the mount 702 to the base member 701. In the retractable clip system 740, the clip 715 is integral to the mount 702 and interfaces with the retention member 716 of the base member 701. Referring now to FIGS. 1, 2, and 4-5D, the clip system 740 can be viewed in more detail. The clip 715 resides within a clip holder 741. The clip 715 may be metallic, plastic or any suitable material that provides strength and flexibility. The clip 715 has a male portion 742 that is supported from a resilient spring like support 743 in the clip holder 741; the male portion 742 is effectively spring loaded within the clip holder 741 and tends to extend out of the clip holder 741 at a clip slot 744. The clip male portion 742 engages the retention member 716 of the base member 701 and can be retracted by the insertion of the decoupling arms 717 of the installation and removal tool 703. The tool will be discussed in more detail later.

The clip holder 741 includes a tool guide slot 750 that accepts the decoupling arms 717 of the installation and removal tool. The tool guide slot 750 is shown in the drawings as being circular in shape, but it may be any geometric configuration e.g. to cooperate with the arms 717 and the clip. The shape of the tool guide slot 750 may be keyed to the shape of the arms 717, e.g. square, circular, hexagonal, or an unusual cross-section shape, so that only arms 717 of the prescribed cross-sectional shape would be able to fit into the tool guide slot and/or to release the mechanical coupling system 712. This keying can provide a measure of security to avoid removal of the mount 702 from the base member 701 by an unauthorized individual.

The tool guide slot 750 provides a path along the surface of the clip 715 such that as the arms 717 are inserted, the arms push the clip 715 inside the clip holder 741, thus disengaging the male portion 742 of the clip from the retention member 716. After the mechanical coupling is disengaged, force may be applied to the mount 702 using the installation and removal tool 703 to break the magnetic bond and thus to remove the mount 702 from the base member 701. It follows that the reverse procedure may be implemented to install the mount 702 to the base member 701. The clip holder 741 also includes a locking pin guide 752, which houses a locking pin 753. The locking pin is discussed in more detail below.

Referring to FIGS. 1 and 2, the installation and removal tool 703 includes a base 718a, which has an attachment slot 718b or socket that allows an elongated member such as pole 720 to be inserted into the base. The attachment slot 718b is shown in the drawings as being circular in shape, but it is not limited to such implementations. Insertion and use of a pole 720 allows the installation and removal tool 703 it to be extended into areas not normally accessible to install and/or remove the mount 702 relative to a base member 701, e.g. without the assistance of some other height altering device, such as a step ladder. The decoupling arms 717 extend out from the base 718a and are of sufficient length to retract the retaining clips 715 as they are inserted into the guide slots 750 urging the male portion 742 of the respective clips into the clip holder 741 so as not to grab to or to lock with respect to the retention member 716 of the mount 702. Also, the decoupling arms 717, as well as the other portions of the tool 703, provide the required strength and stability to support, to manipulate, and/or to position the mount 702, including any attached device 704, and the necessary force required to disengage the magnetic coupling system. The decoupling arms 717 may have a notch 717a to provide an interlock with the locking pin 753, which is discussed below.

Referring back to FIGS. 5A-D, to ensure the mount 702 remains securely attached to the installation and removal tool 703 while the mount 702 is being installed or removed, a locking pin or clip 753 may be included within the clip holder 741 of the mount 702. The locking pin 753 includes a notch 754 and also includes a surface 754a that interfaces with a corresponding notch 717a in a decoupling arm 717 of the installation and removal tool 703. The locking pin or clip 753 is maintained in an extended position by a spring 755, and descends into the clip holder 741 by striking the base member 701 as the mount 702 and base member 701 are mated. The locking pin 753 moves perpendicularly to the tool guide slot 750, thus intersecting the decoupling arm 717 of the installation and removal tool 703 at approximately a 90 degree angle. In the retracted position, the notch 754 of the locking pin 753 aligns with the tool guide slot 750, thus providing an unobstructed path for the decoupling arms 717 to travel. However, if the locking pin 753 is extended, as would be the case when the mount 702 is not mated to the base member 701, the tool guide slot 750 is obstructed by the locking pin surface 754a, preventing an object from passing the locking pin 753. If the decoupling arms 717 are fully inserted into the tool guide slot 750, the notch 717a of the decoupling arm 717 lines up with the locking pin 753. If the locking pin is in the extended position, the locking pin surface 754a interlocks with the decoupling arm notch 717a. This prevents the decoupling arm 717 from being removed from the tool guide slot 750, and the mount 701 is effectively locked to the tool 703.

It will be appreciated that although the tool 703 is shown with two decoupling arms 717, there may be only one or may be more than one, and the clip 715 and associated parts for coupling with the retention member 716 may be correspondingly modified to work in cooperation with a number of decoupling arms. The same or similar method of retaining the mount 702 on the tool 703 also could be achieved in using a clip or the like which could be depressed by any part of the member 701.

In using the system 700 of the present invention, the base member 701 is assumed to be fixed to a rigid member, such as a wall or a pole. One would place the mount 702, including the device 704 onto the installation and removal tool 703. To accomplish this, the retracting pin 753 must be manually depressed into the mount 702. Holding the retracting pins 753 against the mount 702, the decoupling arms 717 of the tool 703 are inserted into the tool guide slots 750. After the decoupling arms 717 are fully inserted into the mount 702, the locking pins 753 are released, thus locking the mount 702 to the tool 703. If not already done, the pole 720 is inserted into the mount and the locking screw 719b is tightened to clamp the pole 720 securely into socket 718b. Using the pole, the assembly is placed against the base member 701. The magnetic coupling system 711 provides holding force to keep the mount 702 attached to the base member 701. As the mount 702 is coupled to the base member 701, the locking pins 753 are pressed into the mount, aligning the notch 754 of the locking pin 753 with the tool guide slot 750. This provides an unobstructed path in the tool guide slot 750 for the decoupling arms 717 to pass through, thus allowing the decoupling arms 717 to be retracted from the mount 702. After the decoupling arms 717 are removed from the mount, the clip 740 extends out of the clip slot 744 and engages the retention member 716 of the base member, thus locking the base member 701 and mount 702 together.

To remove the mount 702 and device 704 from the base member 701, the tool 703 is positioned towards the mount 701. The decoupling arms 717 are inserted into the tool guide slots 750, thus urging the clip 740 back into the clip holder 741 and unlocking the mount 702 from the base member 701. The magnetic coupling system 711 is now holding the base member 701 and mount 702 together. Using the pole 720, force is applied to the mount 702 to break the magnetic bond between the base member 701 and the mount 702. As the mount 702 is separated from the base member 701, the locking pins 753 are extended, placing surface 754a of the locking pin 753 in the tool guide slot 750. Notches 717a of the decoupling arms interlock with the surface 754a to prevent movement of the decoupling arms 717, thus locking the mount to the tool 703. The mount may now be safely lowered to ground level.

As noted hereinabove, various techniques, e.g. screws, clips, adhesive, etc., may be used to couple (attach) the device 704 to the mount 702; or the device 704 may be a part of and/or be integral with the mount 702. In reference to FIG. 1, the disclosure hereinabove discusses attachment of the device 704 to the cover 730 that is part of the mount 702, but examples of the method of attachment (i.e., an attachment feature) are not discussed. However, any particular device must have an attachment feature suitable for attaching the device to the mount 702 in order to become a device 704 that is a component of the inventive coupling system 700. Referring to FIGS. 6-8, examples of some suitable methods of attachment (attachment features) are illustrated. In particular, the forgoing description concerns attachment methods that are detachable but only when accessed for operation from a "back" 1124 of the mount 702, i.e., the side of the mount 702 that is held against the base member 701; therefore the device 704 cannot be attached or detached unless the mount 702 is decoupled from the base member 701. Since a special tool 703 must be used to decouple the mount 702 and base 701, the entire coupling system 700 including any attached device 704 should be considered "tamper resistant."

In FIG. 6, a first device 704a (a first embodiment of the generic device 704) is in the form of an enclosure with a radially inward extending flange 1100 as an attachment feature. Device attachment screws 1102, 1108 can then be utilized as a nut and bolt arrangement to bolt the flange 1100 of the first device 704a together with the face 731 of the cover 730 of the mount 702. Thus the first device 704a is attached to the mount 702 by mounting screws 1102, 1108 that are hidden within the first device (enclosure) 704a and are only accessible for operation (e.g., screwing or unscrewing) from the mount back 1124. Two examples of many possible embodiments of nut and bolt arrangements are illustrated: A threaded stud 1102 extends upward from the flange 1100, passes through a hole 1103 in the cover 730, and is secured by a nut 1104 (e.g., a wing-nut, for convenience sake) hidden in the mount back 1124. In another example, a screw 1108 passes down through a hole 1103 (not visible) in the cover 730, and screws into a threaded hole 1106 in the flange 1100.

Although the mounting screws 1102, 1108 could pass through the part of the mount 702 that has the coupling components (i.e., the part radially within a coupling components housing 738), the device attachment is made easier by radially expanding the outer wall 733 of the cover portion of the mount 702, thereby providing an uncluttered annular area within the mount 702 in back of the cover 730 wherein the cover face 731 extends at least radially between the coupling components housing 738 and the cover outer wall 733, as shown in FIGS. 6-8. Access holes 1110 for the decoupling arms 717 of the installation and removal tool 703 are revealed in the illustration of FIG. 6.

In FIG. 7, a second device 704b (a second embodiment of the generic device 704) is in the form of an active device (e.g., an alarm horn). The second device 704b includes a base 1115 as an attachment feature with a standoff foot extending outward. To hold the device base 1115 against the cover face 731 a flange ring 1114 encircles and overlaps the device base 1115 and is held in place by thumbscrews 1112 (another example of a nut and bolt arrangement) that are only accessible for operation from the mount (cover) back 1124. Wires 1116 supply electrical power from the electrical connections 726 in the mount coupling components housing 738 to the second device 704b.

In FIG. 8, a third device 704c (a third embodiment of the generic device 704) is in the form of a plastic light transmitting enclosure 1101 and a light source 1120 in a lamp holder 1118. For example, the enclosure 1101 could be transparent or translucent, glass, plastic, wire mesh, etc. In this embodiment, the enclosure 1101 is attached by thumbscrew mounting screws 1112 (another nut and bolt arrangement) that are only accessible from the back 1124 of the cover 730. The attachment feature of the enclosure 1101 is one or more screw sockets 1122 that are molded into the enclosure 1101 so that the enclosure 1101 can be held tightly against the face 731 of the mount cover 730 by the mounting screws 1112. Wires 1116 supply electrical power from the mount coupling components housing 738 to the lamp holder 1118. The lamp holder 1118 can be attached by any suitable means to the mount 702. Since the lamp holder 1118 and its attachment to the mount 702 cannot be accessed unless the mount 702 is uncoupled from the base member 701 or unless the enclosure 1101 is removed by unscrewing mounting screws 1112 from the mount back 1124, and since the enclosure 1101 is attached to the mount 702 in a tamper resistant way, then the entire third device 704c including enclosed elements (if any) should be considered tamper resistant.

Other attachment features/methods for attaching the device 704 to the mount 702 in a tamper resistant way should be apparent given the teaching of the present and foregoing related disclosures. All such attachment features (for example: clips, locking tabs, etc.) are within the scope of the present invention provided that the attachment feature is only accessible for operation (e.g., clipping and un-clipping) if the mount 702 is first uncoupled from the base member 701.

The cover 730 has been described herein as a component of the mount 702. Many methods are available for assembling the components of the mount 702. For example, in the mount 702 embodiment illustrated in FIG. 7, the attachment 1113 of the mount cover 730 to the mount coupling components housing 738 comprises screws. Since the attachment 1113 can not be detached unless the second device 704b is removed, then the attachment 1113 should also be considered tamper resistant. Also for example, in the mount 702 embodiment illustrated in FIG. 8, the attachment 1113 of the mount cover 730 to the mount coupling components housing 738 comprises molding the two components together as a single molded plastic part. Adhesive and many other forms of attachment 1113 are also considered within the scope of the present invention provided that the attachment 1113 cannot normally be unattached when the coupling system 700 is fully assembled and coupled to a mounting surface according to the invention.

As described hereinabove, the installation and removal tool 703 has a rather unique structure that makes difficult any unauthorized access to (i.e., tampering with) the coupling system 700 including a device 704. In it's simplest form, the tool's decoupling arm 717 is a round rod of sufficient length. If a vandal is aware of this relatively simple requirement, the tamper resistant features of the coupling system 700 could be circumvented fairly easily providing the coupling system 700 is within reach by the vandal. However, the decoupling arms can take many forms that would still satisfy their intended function of decoupling the mount 702 from the base member 701, but would enhance the tamper resistance of the system, essentially by applying lock and key technology to the decoupling arms 717 as a key, and to the tool guide slot 750 and/or the access holes 1110 as a lock mechanism and/or keyhole.

The round cross-section decoupling arm 717 and the correspondingly round access hole 1110 and tool guide slot 750 can be considered very simple forms of key, keyhole, and lock, respectively. More advanced applications of lock and key technology involve, for example, "keying" the decoupling arms 717, 1717 by making them specially shaped. A few example embodiments of specially shaped decoupling arms 1717 are illustrated in FIGS. 9A, 9B, and 10. FIGS. 9A and 9B show a side view and a perspective view of a tool 703 having two different embodiments of decoupling arms 1717x, 1717y. A first decoupling arm 1717x has a triangular cross-section that would fit into a correspondingly triangular tool guide slot 750 and/or a correspondingly triangular access hole 1110. A second decoupling arm 1717y has a hexagonal cross-section outer shank 1130 that would fit into a correspondingly hexagonal outer portion of the tool guide slot 750 and/or a correspondingly hexagonal access hole 1110, and also has a smaller diameter circular cross-section inner shank 1132 that would fit into a smaller diameter correspondingly circular inner portion of the tool guide slot 750. FIG. 10 shows a perspective view of a third embodiment of a decoupling arm 1717z wherein the otherwise round rod is notched in various locations with varying size and/or shape notches 1134 such as on the edge of a key. For all of the decoupling arms 717, 1717, the tool guide slot 750 has, for example, fingers along its length (e.g., the locking pin 753) that would have to be aligned with the proper depth/shape notches 1134 or other contours of the decoupling arm 717, 1717 in order for the mount decoupling to be accomplished (i.e., the coupling system 712 is operated). Furthermore, the access hole 1110 and/or the tool guide slot 750 can be shaped like a keyhole to only accept a properly shaped decoupling arm 717, 1717. All three of the illustrated decoupling arm embodiments 1717 can still have the locking pin notch 717a.

In essence, the coupling system 700 is, first of all, inherently tamper resistant in that a special tool 703 is required to uncouple it. Secondly, attaching the system components such as a device 704 and a cover 730 according to the methods described hereinabove makes all parts of the coupling system 700 including attached devices 704 tamper resistant. Finally, the coupling system 700 is made even more tamper resistant by applying lock and key technology to the decoupling arms 717, 1717 as a key, and to the tool guide slot 750 and/or the access holes 1110 as a keyhole and lock mechanism. Many other possible lock and key configurations should be evident beyond just changing shape, including for example, the use of special materials, magnets, flexible or curved decoupling arms, and so on.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A tamper resistant system for attaching a device to a mounting surface, the system comprising:
   a base member that is attachable to the mounting surface, and which comprises a first component of a coupling;
   a mount comprising: a second component of the coupling on a back side thereof that, when mated with the first component, removably couples the mount to the base member, a front side suitable for attaching the device thereto, and a cover contiguous with the front side and extending as an outer wall surrounding the mount such that, when the mount is coupled to the base member, the outer wall extends to abut the mounting surface, thereby tamper-resistantly enclosing the base member, the coupling, and the back side of the mount;

an installation and removal tool for operating the coupling;

an access hole in the cover for enabling operative access of the tool to the coupling; and an attachment feature for attaching the device to the front side of the mount, the attachment feature comprising either a permanent connection therebetween, or a detachable connection wherein the attachment feature is removably attached to the device, and passes through the mount to an operative part of the attachment feature on the back side of the mount within the cover;

thereby requiring use of the installation and removal tool in order to detach the device from the mounting surface.

2. The tamper resistant system of claim 1, wherein the coupling further comprises:

a first electrical terminal on the base member and a second electrical terminal on the mount such that the first and second electrical terminals are electrically connected when the mount is coupled to the base member, and such that the first and second electrical terminals are electrically disconnected when the mount is uncoupled from the base member, thereby providing electrical power to the device only when the device is tamper-resistantly attached to the mounting surface.

3. The tamper resistant system of claim 1, further comprising:

a one of the first and second mating components of the coupling comprising a retention member;

an other one of the first and second mating components of the coupling comprising a movable grabber member arranged for coupling to the retention member; and a tool guide slot aligned with the access hole in the cover and providing operative access of the tool to the grabber member.

4. The tamper resistant system of claim 3, further comprising:

a magnetic device to hold the mount and the base member together.

5. The tamper resistant system of claim 3, further comprising:

a keyed shape of the tool; and a keyhole and lock mechanism configuration applied to one or more of: the access hole, the tool guide slot, and the movable grabber mechanism.

6. The tamper resistant system of claim 1, wherein the attachment feature further comprises:

a nut and bolt arrangement wherein a first component of the nut and bolt is fixed as a part of the device, the bolt passes through the mount, and the corresponding second component of the nut and bolt is removably attachable to the first component only when operated from the back side of the mount.

7. The tamper resistant system of claim 1, wherein the attachment feature further comprises:

a clip or a tab passing through the mount to enable operation only from the back side of the mount.

8. The tamper resistant system of claim 1, further comprising:

the attachment feature comprising a foot portion of the device configured for being overlapped and held by a separable flange; wherein:

the device is attached to the front side of the mount by removably attaching the separable flange over the device foot portion using a portion of the flange that passes through the mount to enable operation only from the back side of the mount.

9. The tamper resistant system of claim 1, wherein the attachment feature comprises a fixed attachment of the device to the mount; and the device becomes accessible when the mount is detached from the mounting surface using the installation and removal tool.

10. A method for tamper-resistantly attaching a device to a mounting surface, the method comprising the steps of:

attaching a base member to the mounting surface;

removably coupling a mount to the base member;

covering the mount such that when the mount is coupled to the base member; the base member, the coupling, and a back side of the mount are enclosed between the covering and the mounting surface;

using an installation and removal tool for operating the removable coupling;

allowing operable access through the cover to the coupling only for the tool; and attaching the device to a front side of the mount using an attachment feature comprising either a permanent connection therebetween, or a detachable connection wherein the attachment feature is removably attached to the device, and passes through the mount to an operative part of the attachment feature on the back side of the mount within the cover; such that the attachment feature is only accessible for operation when the mount is uncoupled from the base member.

11. The method of claim 10, further comprising the step of:

supplying electrical power to the device such that the power is electrically connected when the mount is coupled to the base member, and such that the power is electrically disconnected when the mount is uncoupled from the base member.

12. The method of claim 10 further comprising the steps of:

configuring the tool as a key; and applying a keyhole and lock mechanism configuration to one or more of the tool, the coupling, and the mount with covering.

* * * * *